United States Patent
Mahdi et al.

(10) Patent No.: US 9,051,499 B2
(45) Date of Patent: Jun. 9, 2015

(54) TWO-PART POLYURETHANE ADHESIVE FOR BONDING FIBER-REINFORCED PLASTICS

(75) Inventors: Syed Z. Mahdi, Rochester Hills, MI (US); Yee Y. Wang, Novi, MI (US); Arthur F. Cawley, Lake Orion, MI (US)

(73) Assignee: Dow Global Technologie LLC, Midland, MI (US)

( * ) Notice: Subject to any disclaimer, the term of this patent is extended or adjusted under 35 U.S.C. 154(b) by 145 days.

(21) Appl. No.: 13/990,149

(22) PCT Filed: Nov. 17, 2011

(86) PCT No.: PCT/US2011/061107
§ 371 (c)(1),
(2), (4) Date: May 29, 2013

(87) PCT Pub. No.: WO2012/078331
PCT Pub. Date: Jun. 14, 2012

(65) Prior Publication Data
US 2013/0255880 A1    Oct. 3, 2013

Related U.S. Application Data

(60) Provisional application No. 61/420,813, filed on Dec. 8, 2010.

(51) Int. Cl.
*C09J 175/04* (2006.01)
*C09J 5/06* (2006.01)
*C08G 18/08* (2006.01)
*C08G 18/10* (2006.01)
*C08G 18/16* (2006.01)
*C08G 18/32* (2006.01)
*C08G 18/40* (2006.01)
*C08G 18/48* (2006.01)
*C08G 18/63* (2006.01)
*C08G 18/76* (2006.01)
*C08G 18/79* (2006.01)

(52) U.S. Cl.
CPC ............. *C09J 175/04* (2013.01); *C08G 18/089* (2013.01); *C08G 18/10* (2013.01); *C08G 18/168* (2013.01); *C08G 18/3206* (2013.01); *C08G 18/4072* (2013.01); *C08G 18/4816* (2013.01); *C08G 18/4841* (2013.01); *C08G 18/4858* (2013.01); *C08G 18/632* (2013.01); *C08G 18/7664* (2013.01); *C08G 18/797* (2013.01); *C09J 5/06* (2013.01)

(58) Field of Classification Search
CPC .................................. C09J 175/04; C09J 5/06
USPC ........................................... 156/331.7; 528/58
See application file for complete search history.

(56) References Cited

U.S. PATENT DOCUMENTS

| | | | |
|---|---|---|---|
| 4,207,417 A | 6/1980 | Vofsi | |
| 4,876,308 A | 10/1989 | Melby | |
| 5,002,806 A | 3/1991 | Chung | |
| 5,143,996 A | 9/1992 | Chung | |
| 5,175,228 A | 12/1992 | Wang | |
| 5,354,609 A | 10/1994 | Wang | |
| 5,508,111 A | 4/1996 | Schmucker | |
| 5,548,056 A | 8/1996 | Chung | |
| 5,719,252 A | 2/1998 | Dormish | |
| 5,955,199 A | 9/1999 | Johnson | |
| 6,348,121 B1 * | 2/2002 | Schoener et al. | 156/307.1 |
| 2009/0044907 A1 * | 2/2009 | Tribelhorn et al. | 156/307.4 |
| 2010/0186897 A1 * | 7/2010 | Barker et al. | 156/331.7 |

FOREIGN PATENT DOCUMENTS

CA    2146076 A    10/1995

* cited by examiner

*Primary Examiner* — Michael N Orlando
*Assistant Examiner* — Daniel Lee
(74) *Attorney, Agent, or Firm* — Gary C Cohn PLLC

(57) ABSTRACT

A two-part polyurethane adhesive system includes a resin component A and a curative B. The resin component A includes a monomeric polyisocyanate and a prepolymer. The curative B includes a of ether polyol having a molecular weight of from 3000 to 20,000 and another polyol having 4-8 hydroxyl groups and a molecular weight of from 200 to 1000. The system includes a tin (IV) catalyst, which is contained in the resin component, and a blocked aza-type catalyst, which is contained in the curative. The system has excellent shelf stability, gives an excellent open time at ambient temperatures, and cures rapidly when heated to 65° C. or higher.

4 Claims, No Drawings

TWO-PART POLYURETHANE ADHESIVE FOR BONDING FIBER-REINFORCED PLASTICS

This application claims priority from U.S. Provisional Patent Application No. 61/420,813, filed 8 Dec. 2010.

This invention pertains to a two-part polyurethane adhesive and a method for bonding a fiber-reinforced plastic with a two-part polyurethane adhesive.

Fiber-reinforced plastics such as sheet molding compound (SMC), resin transfer molding (RTM), bulk molding compound (BMC) and reinforced dicyclopentadiene (DCPD) polymers are commonly used to form body panels and other exterior components of automobiles, trucks and other vehicles. These parts are often assembled to each other or to the rest of the vehicle through the use of an adhesive.

Two-part polyurethane adhesives are known to be useful in this application. For example, U.S. Pat. No. 4,876,308 describes such a two-part adhesive. The adhesive described there includes a "resin" side, which includes an isocyanate-terminated prepolymer, and a "curative" side, which includes one or more polyols. An excess of isocyanate groups is said to provide good adhesion in a primerless bonding system.

US Published Patent Application No. 2009/0044907 also describes a two-part adhesive which is formulated to provide a shear modulus which varies little across the temperature range from 0 to 100° C.

Production protocols often are such that a heat-activatable cure is desirable. A good heat-activatable adhesive will react slowly when the two parts of the adhesive mixed at room temperature. This permits a good working or "open" time, in which the viscosity of the adhesive remains low so it can be applied to the substrate surfaces and the substrate surfaces arranged into the desired bonding position. It may be necessary to provide an open time of 15 minutes or more. However, once the adhesive has been applied and the substrate surfaces have been brought into the desired positions, it is often necessary to complete the cure rapidly by applying heat. Catalytic approaches have been used to produce this curing behavior. U.S. Pat. No. 6,348,121 describes a catalyst mixture that includes a heat activatable aza or amine catalyst, such as a blocked 1,5-diazabicyclo(5,4,0)undec-5-ene, together with an organotin catalyst such as dibutyl tin dilaurate, which is complexed with an excess of a mercapto compound complexing agent (such as glycol dimercaptopropionate). These catalysts are blended into the curative side of the adhesive composition. This catalyst combination is said to provide good latency at room temperature followed by very rapid cures at 99° C. However, a problem with this approach is that the adhesive system seems to cure poorly after it is stored for prolonged periods. This is a very significant problem, because adhesives are commonly packaged some weeks or even months before they are used.

Another problem that is frequently encountered is that bubbles form in the adhesive as it cures, especially when the curing is performed at an elevated temperature. The bubbles weaken the adhesive and can lead to adhesive failure rather than the cohesive failure that often is desired when fiber-reinforced plastics are bonded.

What is desired is an adhesive which remains reactive even after prolonged storage, provides for a good open time at ambient temperature while providing for a rapid cure at some elevated temperature of at least 65° C., and which adheres strongly to fiber-reinforced plastics such as SMC, even when used without a primer.

This invention is in one aspect a two-component polyurethane adhesive system, comprising a resin component A and a separately packaged curative B, each of which are liquids having a Brookfield viscosity of from 5,000 to 50,000 cps at 25° C., wherein:

the resin component A has an isocyanate equivalent weight of from 230 to 350 and comprises (A-1) a mixture of isocyanate compounds, which mixture is liquid at 25° C., has an average isocyanate content of from 15 to 23% by weight and includes a monomeric polyisocyanate compound and prepolymer which is a reaction product of at least one polyisocyanate and at least one isocyanate-reactive compound that includes a substantially difunctional polyether polyol having a molecular weight of from 1000 to 3000 and (A-2) at least one tin (IV) catalyst, and the curative B has an equivalent weight per isocyanate-reactive group of from 250 to 450 and comprises (B-1) at least one polyether polyol which contains from 2 to 4 hydroxyl groups per molecule and has a number average molecular weight of from 3000 to 20,000; (B-2) at least one polyol having from 4 to 8 hydroxyl groups per molecule and a molecular weight of from 200 to 1000 and (B-3) at least one blocked aza catalyst which is heat activatable at a temperature of at least 65° C.

The invention is also a process for bonding a pair of substrates, comprising
a) mixing together the resin component and the curative of the two-component polyurethane system of the invention, at a mixing ratio such that the mixture contains an excess of isocyanate groups, to form a heat-curable adhesive;
b) applying the heat curable adhesive to a bondline intermediate to the substrates; and
c) heating the heat-curable adhesive to a temperature of at least that at which the blocked aza catalyst becomes activated to cure the heat-curable adhesive and form an adhesive bond between the substrates at the site of the bondline.

The adhesive composition of the invention has several desirable attributes. It displays excellent heat-activatable curing, in that when the resin and curatives are mixed at temperatures of about 25° C., they exhibit an open time which often extends for 15 minutes or more, and then rapidly cure when heated above a threshold temperature, which is at least 65° C. and more typically at least 80° C. The adhesive bonds very strongly to a number of substrates, notably fiber-reinforced plastics such as SMC, even when used in primerless applications. Adhesive failure to fiber-reinforced plastics tends to be in the desired fiber tear mode, in which the failure occurs due to the breakage of fibers or by pulling the fibers out of the substrate.

Still another advantage is that the adhesive system is highly storage stable, in at least two respects. The adhesive system retains its reactivity even after the components are stored for significant periods of time. Loss of reactivity, as is seen with the adhesive systems of U.S. Pat. No. 6,348,121, is significantly reduced with this invention. In addition, the individual resin component and curative each can be stored for prolonged periods with minimal advancement in molecular weight (as evidenced by little or no increases in viscosity), even when stored at significantly elevated temperatures, such as up to as much as 65° C. This is particularly surprising in connection with the resin component which contains the tin (IV) catalyst, which would be expected to promote some molecular weight advancement of the isocyanate-terminated materials.

The newly-cured adhesive of the invention has a further advantage in that excess amounts that exude from the bondline during the gluing process tend to be easily removed. Still another advantage is that the adhesive tends not to yellow significantly when cured or post-baked at elevated temperatures.

The resin component of the adhesive system includes a mixture of isocyanate compounds. The mixture of isocyanate compounds is liquid at 25° C. and has an average isocyanate content of from 15 to 23% by weight (corresponding to an isocyanate equivalent weight 250 to 183). The isocyanate content of the mixture of polyisocyanate compounds is preferably from 18 to 23% by weight (corresponding to an isocyanate equivalent weight of from 233 to 183).

The mixture includes an isocyanate-terminated reaction product (a "prepolymer") of at least one polyisocyanate and at least one isocyanate-reactive compound that includes a substantially difunctional polyether polyol having a molecular weight of from 1000 to 3000.

In addition, the mixture of isocyanate compounds includes at least one monomeric polyisocyanate compound. For purposes of this invention, a "monomeric" polyisocyanate compound is a compound containing from 2 to 4 isocyanate groups per molecule, and which is devoid of urethane or urea linkages. The "monomeric" polyisocyanate may contain isocyanurate, biruet, carbodiimide, uretdione or allophonate linkages. The monomeric polyisocyanate typically has an isocyanate content of at least 25% by weight.

The mixture of isocyanate compounds can be made by either of two methods. In the first method, a material(s) containing isocyanate-reactive groups (including the difunctional polyether polyol having a molecular weight of from 1000 to 3000) is mixed with the entire quantity of the monomeric polyisocyanate(s) and the resulting mixture is allowed to react until a constant isocyanate content is achieved. This method produces the mixture of isocyanate compounds directly. In the second method, the material(s) containing isocyanate-reactive groups (including the difunctional polyether polyol having a molecular weight of from 1000 to 3000) is mixed with only a portion of the monomeric polyisocyanate(s), allowed to react to form a prepolymer, and the prepolymer is then blended with the remainder of the monomeric polyisocyanate(s) to produce the final mixture of isocyanate compounds.

Useful monomeric polyisocyanates include aromatic or aliphatic polyisocyanate compounds such as m-phenylene diisocyanate, 2,4- and/or 2,6-toluene diisocyanate (TDI), the various isomers of diphenylmethanediisocyanate (MDI), polyphenylene polymethylene polyisocyanates (polymeric MDI or PMD I), 1,6-hexanediisocyanate, tetramethylene-1, 4-diisocyanate, cyclohexane-1,4-diisocyanate, hexahydrotoluene diisocyanate, hydrogenated MDI ($H_{12}$ MDI), naphthylene-1,5-diisocyanate, methoxyphenyl-2,4-diisocyanate, 4,4'-biphenylene diisocyanate, 3,3'-dimethyoxy-4,4'-biphenyl diisocyanate, 3,3'-dimethyldiphenylmethane-4,4'-diisocyanate, 4,4',4"-triphenylmethane diisocyanate, hydrogenated polymethylene polyphenyl polyisocyanates, toluene-2, 4,6-triisocyanate and 4,4'-dimethyldiphenylmethane-2,2',5, 5'-tetraisocyanate. Any of the foregoing that is modified to include isocyanurate, biruet, carbodiimide, uretdione or allophonate linkages also can be used.

Polymeric MDI is a preferred monomeric polyisocyanate. "Polymeric MDI" (or "PMDI"), as used herein, refers to a mixture of diphenylmethane diisocyanate and polyphenylene polymethylene polyisocyanates. The polyphenylene polymethylene polyisocyanates tend to be mainly three-ring and four-ring structures, although some higher molecular weight materials may be present. These polymeric MDI materials are produced by first condensing aniline with formaldehyde to form a mixture of methylene dianiline and polyphenylene polymethylene polyamines, and then by phosgenating the amine mixture to convert the amine groups to isocyanate groups. A portion of the diphenylmethane diisocyanate (MDI) may be removed from the crude product by distillation. This tends to increase the isocyanate equivalent weight and the functionality (average number of isocyanate groups/molecule). Polymeric MDI products of interest herein contain from 2.5 to 3.5 isocyanate groups per molecule and have an isocyanate equivalent weight of from about 130 to 150, preferably from about 132 to 140. Suitable polymeric MDI products are sold by The Dow Chemical Company under the trade names Voranate PAPI®20, PAPI® 27 and PAPI® 32.

A polymeric MDI can be the only polyisocyanate used to prepare the prepolymer. However, it is possible to use a mixture of polymeric MDI with other polyisocyanates such as are described before. It is preferred that polymeric MDI constitutes at least 20% by weight of any such mixture of polyisocyanates, and it preferably constitutes at least 40% and still more preferably at least 50% by weight of any such mixture. A preferred polyisocyanate mixture contains from 20 to 99 parts by weight, preferably from 40 to 80 parts by weight of polymeric MDI and from 1 to 80, preferably from 20 to 60, parts by weight of a carbodiimide- and/or uretdione-modified MDI product which is a liquid at room temperature. Such a carbodiimide- or uretdione-modified MDI may have an isocyanate functionality of from 2.0 to 2.5 and an isocyanate equivalent weight of from 130-150. An example of such a carbodiimide- or uretdione-modified MDI is sold by The Dow Chemical Company under the name Voranate® 143L.

Another useful mixture of monomeric polyisocyanates is a mixture of at least one aromatic polyisocyanate and at least one aliphatic polyisocyanate. The aliphatic polyisocyanate in such a case is preferably a polymeric MDI or a mixture of a polymeric MDI and a carbodiimide- or uretdione-modified MDI. The aliphatic polyisocyanate in such a case preferably contains isocyanurate groups. A trimerized butane-1,4-diisocyanate, a trimerized hexane-1,6-diisocyanate or a trimerized isophorone diisocyanate is especially useful in such a case. When a mixture of aromatic and aliphatic polyisocyanates is used, it is preferably to provide enough of the aliphatic polyisocyanate so that the resin component contains about 10 to 25 equivalents of aliphatic isocyanate group per 100 equivalents of aromatic isocyanate groups.

When a mixture of aromatic and aliphatic polyisocyanates is used, it is preferred to form the prepolymer by reacting some or all of the aromatic polyisocyanates with the isocyanate-reactive compound(s) to form a prepolymer, and then to combine the prepolymer with the aliphatic polyisocyanate(s) and any remaining aromatic polyisocyanate(s).

The polyisocyanate(s) are selected together with the isocyanate-reactive compound(s) used to make the prepolymer such that the mixture of polyisocyanate compounds is a liquid at 25° C.

The isocyanate reactive compound(s) used to make the prepolymer include at least one substantially difunctional polyether polyol having a molecular weight of from 1000 to 3000. This polyether polyol is preferably a poly(propylene oxide) or a copolymer of at least 70 weight percent propylene oxide and up to 30 weight percent ethylene oxide. Additional polyols, polyamines and/or aminoalcohols can be used in making the prepolymer, in addition to this difunctional polyether polyol. These additional polyols typically constitute no more than 50%, preferably no more than 20% and still more preferably no more than 10% of the total weight of all isocyanate-reactive compounds used to make the quasi-prepolymer. The additional polyols, polyamines and/or aminoalcohols may have equivalent weights per isocyanate-reactive group of from 31 to 4000 or more, and may contain from 2 to 8 or more isocyanate-reactive groups per molecule.

The resin component further includes at least one at least one tin (IV) catalyst. The tin (IV) catalyst may include, for example, a dialkyltindicarboxylate, dialkyltindimercaptide or dialkyltindialkylmercaptoacetate catalyst. The dialkyltindicarboxylate catalyst can be represented by the structure I:

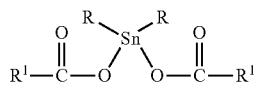

wherein each R is alkyl, preferably $C_{1-8}$ alkyl, more preferably $C_{1-4}$ alkyl, and each $R^1$ is alkyl, preferably $C_{4-18}$ alkyl, more preferably $C_{4-12}$ alkyl. Examples of catalysts of this type include dimethyltindioctoate, dibutyltindioctoate, dioctyltindioctoate, dimethyltindilaurate, dibutyltindilaurate, dioctyltindilaurate and the like. The dialkyltindimercaptide catalyst can be represented by the structure II:

wherein R and $R^1$ are as defined with regard to structure I. Examples of catalyst of this type include dimethyl tin di(dodecylmercaptide), dibutyltindi(dodecylmercaptide), dioctyltindi(dodecylmercaptide) and the like. Catalysts of these types are sold commercially by Witco Chemical Corp. as Fomrez® UL-6, UL-1 and UL-32 catalysts, and by Air Products as Dabco®120 catalyst. The dialkyltindialkylmercaptoacetate catalyst can be represented by the structure III:

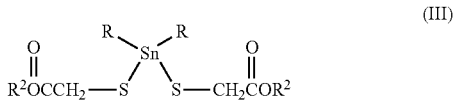

wherein each R is as described before and each $R^2$ is alkyl, preferably $C_{4-12}$ alkyl, more preferably $C_{4-8}$ alkyl. Preferred catalysts are those in which the R group in structure II is methyl or butyl and the $R^2$ group is octyl or dodecyl. A commercially available catalyst of that type is Fomrez® UL-24, sold by Witco Chemical Corp.

The tin (IV) catalyst is present in the resin component in a catalytically effective amount. A suitable amount is from 0.01 to about 1 weight percent of the resin component, and a more preferred amount is from 0.1 to 0.5 weight percent.

The resin component may contain other, optional materials. These may include, for example, fillers, colorants, rheology modifiers such as plasticizers and thixotropic agents, surfactants, biocides and the like. A particulate filler is often preferred, as the filler reduces cost and also tends to increase the viscosity of the resin component. Fillers and/or rheology modifiers may also serve to adjust the isocyanate content of the resin component to a desired amount in order to, for example, simplify mixing ratios when the resin component is mixed with the curative. Suitable fillers include various clays, talc, magnesium silicate, titanium dioxide, mica, ground glass, carbon black and the like. A particulate filler may constitute from 0 to 50% of the total weight of the resin component. A preferred amount is from 25 to 40%.

The formulated resin component should have a Brookfield viscosity, as measured at 25° C. using a ° C. using a 7 spindle at 10 rpm, of from 5,000 to 50,000 cps, preferably from 10,000 to 35,000 cps. It should have an isocyanate equivalent weight of from 230 to 350.

The curative contains at least three components: at least one polyether polyol (B-1) or mixture thereof, which polyol or mixture thereof is a liquid at 25° C. and which contains from 2 to 4 hydroxyl groups per molecule and has a number average molecular weight of from 3000 to 20,000; at least one polyol (B-2) having from 4 to 8 hydroxyl groups per molecule and a molecular weight of from 200 to 1000 and at least one blocked aza catalyst (B-3), which is heat activatable at a temperature of at least 65° C.

The polyether polyol (B-1) may be, for example a polymer of ethylene oxide, 1,2-propylene oxide, 1,2-butylene oxide, 1,4-butylene oxide (tetramethylene oxide) or a mixture of any two or more thereof. Polyether polyol (B-1) is preferably a poly(propylene oxide) or a copolymer of at least 70 weight percent propylene oxide and up to 30 weight percent ethylene oxide. It preferably contains an average of from 2.5 to 3.5 hydroxyl groups per molecule and preferably has a molecular weight of from 4000 to 10,000 or from 4000 to 6,000. Polyether polyol (B-1) may constitute 30% or more of the curative. Preferably, it constitutes from 30 to 70% thereof and more preferably constitutes from 40 to 60% thereof, by weight. Polyether polyol (B-1) may contain urethane and/or urea groups, as is the case when the polyether polyol (B-1) is a hydroxyl-terminated prepolymer, i.e., the reaction product of an excess of a polyether polyol with at least one polyisocyanate.

Polyether polyol (B-1) in some embodiments is or includes a dispersion of polymer particles in a continuous polyether polyol phase. Such dispersions are commonly known as "polymer polyols"; the polymer particles are generally formed by polymerizing monomeric materials in the presence of the polyether polyol, and most typically are at least partially grafted onto the polyether polyol. The dispersed polymer particles may be a polymer of styrene, acrylonitrile or a copolymer of styrene or acrylonitrile, or may contain urethane and/or urea groups (including the so-called "PIPA or PHD" polyols). The dispersed polymer particles may constitute up to 50% of the total weight of all polyether polyol (B-1) materials, but preferably constitute (if present at all) from 5 to 40% by weight thereof. Polyether polyol (B-1) may be a mixture of a polyether polyol (which does not contain dispersed polymer particles) and a polymer polyol.

The polyol (B-2) preferably contains an average of from 4 to 6 hydroxyl groups per molecule and has a molecular weight of from 400 to 800. The polyol (B-2) is preferably a polyether polyol made by adding an alkylene oxide onto an initiator compound or mixture of initiator compounds, the initiator or initiator mixture having an average of from 4 to 8, preferably 4 to 6 hydroxyl, primary amino and/or secondary amine groups per molecule. Suitable initiators for polyol (B-2) include pentaerythritol, sucrose, sucrose/glycerin mixtures, sorbitol and the like. The polyol (B-2) may contain phosphorus. Polyol (B-2) is believed to contribute to sag resistance by providing some early crosslinking as the adhesive system of the invention begins to cure. It may constitute from 5 to 20% of the weight of the curative, preferably from 10 to 15 weight percent thereof.

The curative also contains at least one blocked aza catalyst (B-3), which is heat activatable at a temperature of at least 65° C. The aza catalyst includes at least one aliphatic, heterocyclic ring that includes a nitrogen atom. Examples of such aza catalysts include 1,5-diazabicyclo(5,4,0)undec-5-ene and 1,8-diaza-bicyclo(5.4.0)undec-7-ene. The aza catalyst is blocked with an organic carboxylic acid or a phenolic compound (such as phenol itself). The aza catalyst and the blocking agent are selected together such that the catalyst becomes active only when heated to a temperature of at least 65° C., preferably at least 80° C. A phenol-blocked 1,5-diazabicyclo (5,4,0)undec-5-ene catalyst is preferred. Such a catalyst is commercially available from Air Products and Chemicals under the trade name Polycat® SA-1. The blocked aza catalyst is used in a catalytically effective amount. A suitable amount is from 0.05 to 5% of the weight of the curative, and a preferred amount is from 0.1 to 0.6% of the weight thereof.

The curative may contain components in addition to the three mentioned already. Among these are auxiliary polyols and/or polyamines, which may have an equivalent weight per isocyanate-reactive group of from about 30 to 1000 and from 2 to 3 hydroxyl, primary amino and/or secondary amino groups per molecule. Auxiliary polyols or polyamine in the aggregate may constitute up to 10% of the weight of the curative. Examples of auxiliary polyols include propylene glycol, ethylene glycol, dipropylene glycol, tripropylene glycol, diethylene glycol, triethylene glycol, glycerin, trimethylolpropane, diethanol amine, monoethanol amine, pentaerythritol and the like.

A preferred type of auxiliary polyol is a phosphorus-containing polyol. Such phosphorus-containing polyols include those described in U.S. Pat. No. 5,354,609, including those having structure IV

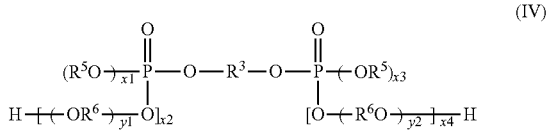

(IV)

wherein x1, x2, x3 and x4 are all independently 0, 1 or 2, provided that x1+x2=2 and x3+x4=2; y1 and y2 are each independently from 0 to 20; each $R^5$ is independently alkyl having from 1 to 15 carbon atoms; each $R^6$ is independently alkylene having from 1 to 6 carbon atoms; and $R^3$ is alkylene having from 1 to 15 carbon atoms; or structure V

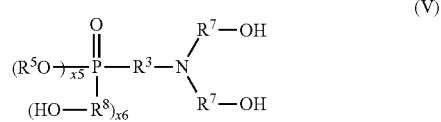

(V)

wherein $R^3$ and $R^5$ are as before, each $R^7$ and $R^8$ is independently alkylene having from 1 to 6 carbon atoms, and x5 and x6 are independently 0, 1 or 2, provided that x5+x6=2 and further provided that the structure V compound has 2 or 3 hydroxyl groups per molecule. A specific example of such a phosphorus-containing polyol is a polypropoxylated dibutyl pyrophosphoric acid, such as is marketed by Albemarle Corporation under the trade designation Antiblaze™ 82. The phosphorus-containing polyol, if present, suitably constitutes from 1 to 10, preferably from 3 to 7 percent of the total weight of the curative. The phosphorus-containing polyol is believed to improve the adhesive strength of the cured adhesive.

A suitable auxiliary polyamine compound contains two or more aliphatic primary or secondary amino groups. The amino groups may be bonded to a carbon atom that forms part of an alicyclic ring structure. A specific example of such a polyamine compound is bis(4-amino-3-methylcyclohexyl) methane, which is available commercially under the trade designation Ancamine® 2049. The auxiliary polyamine compound provides anti-sagging characteristics to the adhesive composition by providing a small amount of rapid curing which leads to an increase in viscosity when the resin and curative are first mixed. However, an auxiliary polyamine compound should be present in only small quantities (if at all), so that a useful open time is preserved. An auxiliary polyamine compound, if present, suitably constitutes from 0.25 to 3, more preferably from 0.25 to 2, weight percent of the curative.

The curative may contain a particulate filler, for the same reasons as a filler may be incorporated into the resin component. Particular fillers as described before with respect to the resin components are suitable. A particulate filler may constitute from 0 to 50% of the total weight of the resin component. A preferred amount is from 10 to 30% by weight.

A water scavenger is often a desirable component of the curative, as this material binds with water as may be present in the curative and therefore reduces the formation of carbon dioxide through the reaction of water with isocyanate groups in the resin component. Molecular sieves, calcium oxide are suitable water scavengers, but other types may be used as well. The water scavenger should not react with isocyanate groups or with the polyol(s) in the curative. The water scavenger is present in an effective amount; a suitable amount is from 1 to 10% of the total weight of the curative, preferably from 3 to 7%. A preferred curative contains from 1 to 7 weight percent of molecular sieves, from 0.5 to 5 weight percent of calcium oxide, or both.

The curative also preferably contains a defoamer. A defoamer is a material that destabilizes bubbles that may be present as the adhesive cures, so that the gasses can escape from the curing adhesive. Various silicon compounds are useful defoamers. Specific examples include those sold by Byk-Chemie, GmbH under the "Byk" trade designation, including, for example, Byk 067.

Another useful component, especially when the adhesive is formulated to be clear or white in color, is a fluorescing agent. The fluorescing agent may be blended into the resin or the curative component. The fluorescing agent permits the extent of mixing to be monitored by exposing the adhesive mixture to ultraviolet light. Suitable fluorescing agents include those described in U.S. Pat. No. 7,736,692.

The curative may also contain one or more colorants, rheology modifiers such as plasticizers or thixotropic agents (such as fumed silica), surfactants, biocides and the like.

The formulated curative should have a Brookfield viscosity, as measured at 25° C. using a ° C. using a 7 spindle at 10 rpm, of from 5,000 to 50,000 cps, preferably from 10,000 to 35,000 cps.

The resin component and the curative are preferably each formulated so that, when equal volumes are mixed together, the resulting heat-curable adhesive contains from about 1.05 to 1.5, more preferably from 1.10 to 1.35 and still more preferably from 1.15 to 1.25, isocyanate groups per isocyanate-reactive group that is contributed by the curative, prior to any reaction between the two components. Stated another way, the equivalent weight per isocyanate-reactive group in the fully formulated curative is preferably 1.05 to 1.5, more preferably from 1.10 to 1.35, and still more preferably from 1.15 to 1.25, times the isocyanate equivalent weight of the fully formulated resin component.

The resin and curatives of the adhesive system of the invention are prepared separately and maintained separately until such time as they are applied to form an adhesive bond between two substrates. The components typically are packaged separately from each other to avoid contact between them until such time as they are to be used. They may be packaged separately into cartridges or other convenient packaging.

The adhesive system is used to bond a pair of substrates. This is accomplished by mixing the resin component and the curative together to form a heat-curable adhesive, applying the heat curable composition to a bondline intermediate to the substrates; heating the heat-curable adhesive to a temperature of at least 65° C. to cure the heat-curable adhesive and form an adhesive bond between the substrates at the site of the bondline.

The mixing step can be performed manually or using any convenient apparatus. If the benefit of a long open time is desired, the mixing step should be performed at some temperature below the threshold temperature at which the blocked aza catalyst becomes activated. The mixing temperature can be any lower temperature at which the resin component and the curative are both flowable. A preferred mixing temperature is from 0 to 40° C. and a more preferred mixing temperature is from 15 to 35° C. On the other hand, mixing can be performed at a temperature above that at which the blocked aza catalyst becomes activated, if a long open time is neither needed nor desired.

The mixed resin component and curative form a heat-curable adhesive. If the heat-curable adhesive is maintained at a temperature below the activation temperature of the blocked aza catalyst, it will tend to cure slowly, and thus provides a significant open time. The open time, i.e., the time required before the composition cures to the extent that it can no longer be worked, may be from 1 to 15 minutes or more at 25° C., is preferably at least 10 minutes and is more preferably at least 15 minutes at 25° C.

The resin component and the curative are mixed at a ratio such that the resulting heat-curable adhesive contains an excess of isocyanate groups. That is, before any reaction takes place between the resin component and the curative, the number of isocyanate groups contributed by the resin component is greater than the number of isocyanate-reactive groups contributed by the curative. Preferably, the resin component contributes from 1.05 to 1.5, preferably from 1.10 to 1.35 and more preferably from 1.15 to 1.25, isocyanate groups per isocyanate-reactive group contributed by the curative. It is preferred to formulate the resin component and the curative so that isocyanate and isocyanate-reactive groups are provided in such proportions when equal volumes of the resin component and the curative are mixed together.

The heat-curable adhesive that is formed in the mixing step is then applied to a bondline intermediate to pair of substrates to be bonded together. This is done by applying the heat-curable adhesive to the surface of one or both of the substrates, in the locations at which the adhesive bond is desired, and then contacting the substrates together such that the heat-curable adhesive is interposed between the substrates. Again, the method of doing this is not critical, and this step can be performed manually or using a wide variety of equipment types. The heat-curable adhesive is of course applied before it has cured significantly. Typically, the heat-curable adhesive is maintained at a temperature lower than that at which the blocked aza catalyst becomes activated, until such time as it has been applied to the substrates. However, it is possible to apply the heat-curable adhesive while hot, if the composition can be applied and the substrates brought together to form the bondline before the heat-curable composition cures too extensively.

It is not necessary to apply a primer to the surfaces of the substrates before applying the adhesive. An advantage of this invention is that very good adhesion can be obtained to a variety of substrates, including fiber-reinforced plastics such as sheet molding compound (SMC), resin transfer molding (RTM), bulk molding compound (BMC) and reinforced dicyclopentadiene (DCPD) polymers, in a primerless process. It is of course within the scope of the invention to apply a primer to the substrate surface before applying the adhesive, but this is in most cases unnecessary as the primer tends to have little if any positive effect.

A wide variety of materials can be used as the substrate including, for example, organic polymers, which may be either thermoplastic or thermosetting materials; metals such as various steel alloys, aluminum, magnesium, titanium, copper, bronze and the like; ceramic material, lignocelluosic materials such as wood, paper and cardboard; as well as other substrates. A substrate of particular interest is a fiber-reinforced plastic, such as sheet molding compound (SMC), resin transfer molding (RTM), bulk molding compound (BMC) and reinforced dicyclopentadiene (DCPD) polymers. The fiber-reinforced plastic is, for purposes of this invention, a composite containing fibers that are embedded in and bonded together with an organic polymer matrix. The fibers are characterized in having aspect ratios (length divided by diameter) of at least 10, preferably at least 20, and a diameter of from 100 nm to 1 mm. The fibers can be in the form of continuous rovings, long fibers having lengths of from 2.5 centimeters to 360 centimeters or more, or short fibers which may have lengths from 2.5 millimeters up to 2.5 centimeters. The fibers may be, for example, glass or other ceramic, metal, carbon, plant fibers (such as jute or hemp), and the like. The organic matrix can be any organic polymer which can be shaped using a combination of heat and compression. Various thermoplastic materials such as polystyrene, acrylonitrile-butadiene-styrene resins, styrene-acrylonitrile resins, polycarbonates, polyamides, polyacrylate and polymethacrylate polymers and copolymers, polyolefins such as polyethylene, polypropylene, so-called thermoplastic polyolefin (TPO) materials, and the like can be used, as well as a variety of other thermoplastic polymers. In addition, the organic polymer may be a material which is heat-softenable but thermosettable, such as a B-staged epoxy resin or B-staged polyester resin.

A preferred substrate is sheet molding compound (SMC). SMC is a compression-moldable composite that contains 10-60% by weight of fibers in a matrix of a heat-softenable but curable polyester and/or epoxy resin. The fibers may be in the form of roving or short fibers. The polyester and/or epoxy resin is generally B-staged (i.e., partially cured to provide it with a higher softening temperature and/or melt viscosity), but retains functional groups which permit it to cure to a thermoset upon heating to a sufficient temperature. The SMC material may also contain a particulate, non-fibrous filler as well as a curing catalyst and mold release agent. Sheet molding compound is typically formed into sheets that have a thickness of from about 1 millimeter to 50 millimeters.

The adhesive system of the invention can be used, for example, to bond a fiber-reinforced plastic to another fiber-reinforced plastic, or more particularly SMC to SMC. It can be used to bond a fiber-reinforced plastic such as SMC to another material such as another organic polymer, a metal, a ceramic or a lignocellulosic material. Specific applications include bonding vehicular body panels to each other or to one or more other components of a vehicle.

One the heat-curable adhesive has been applied and the substrates brought together to form the bondline, the composition is cured by heating it to a temperature of at least 65° C.

This activates the blocked aza catalyst, which permits the composition to cure and form an adhesive bond between the substrates at the site of the bondline. A preferred curing temperature is at least 80° C. and a more preferred curing temperature is from 90 to 120° C. Curing generally occurs rapidly once the catalyst becomes activated. Cure times are typically in the range of from 0.5 to 5 minutes.

The following examples are provided to illustrate the invention, but are not intended to limit the scope thereof. All parts and percentages are by weight unless otherwise indicated.

EXAMPLE 1

Preparation of Resin Component 480 parts of a 2.7 functional polymeric MDI (PAPI®27 from The Dow Chemical Company) and 400 parts of a carbodiimide-modified MDI (ISONATE 134L® from The Dow Chemical Company) are heated at 90° C. for 30 minutes under vacuum. 708 parts of calcined clay and 10 parts of a carbon black paste are added and mixed in for 10 minutes. Then, 398 parts of a 2000 molecular weight poly(propylene oxide) diol are added and mixed in for 30 minutes while maintaining vacuum and the temperature at 90° C. The resulting quasi-prepolymer is then cooled to room temperature and 0.22 parts of a mixture of 30 parts of dibutyl tin mercaptide catalyst (Fomrez® UL-6 from Momentive Performance Products) mixed in a plasticizer are mixed in for 10 minutes under vacuum. The resulting mixture is filled into plastic cartridges. The Brookfield viscosity (25° C., #7 spindle, 10 rpm) of the resin component A is 10,000-14,000 cps. The isocyanate content of the resin component A is 12-13% by weight.

The storage stability of resin component A is evaluated by measuring the isocyanate content and viscosity of resin component A. Then, separate portions of resin component A are placed into separate jars and heated for 3 days at 40° C., 54° C. and 65° C. The samples are then cooled to room temperature, and the isocyanate and viscosity of each are again measured. Good stability is indicated by small or no change in isocyanate content and viscosity. The initial isocyanate content of resin component A is 12.89% by weight. That of the sample heated at 40° C. is 12.92%; that of the sample heated at 54° C. is 13.01%, and that of the sample heated at 65° C. is 12.89%. These values indicate excellent storage stability.

The initial viscosity of resin component A is 12,800 cps. The samples heated at 40° C. and 54° C. show the same viscosity; that heated to 65° C. shows only a slight increase, to 13,100 cps. The viscosity results also confirm the excellent storage stability of resin component A, despite the presence of a catalyst.

Preparation of Curative Component:

1320 parts of a 4900 molecular weight, ethylene oxide-capped poly(propylene oxide) triol (Voranol® 4701 polyol, from The Dow Chemical Company) and 400 parts of a 700 molecular weight, 4.7-functional polyether polyol (Voranol® 360, from The Dow Chemical Company) are mixed at 110° C. under vacuum for one hour. 800 parts of talc, 400 parts of calcined clay, 200 parts of a molecular sieve and 30 parts of fumed silica are added together and mixed into the polyols for one hour. The temperature is reduced to 50° C. and 240 parts of propylene glycol and 40 grams of an amine catalyst (Ancamine® 2049) are added and mixed in under vacuum for 30 minutes. The blend is then cooled to room temperature, and 2 parts of a 25% by weight mixture of phenol blocked 1,5-diazabicyclo(5,4,0)undec-5-ene (Polycat® SA-1 catalyst) in the Voranol 4701 polyol are added and mixed in for 10 minutes. The resulting curative is then filled into plastic cartridges. The Brookfield viscosity (25° C., #7 spindle, 10 rpm) of the curative B is 22,000 cps.

Wedge-Peel Adhesion Testing:

Adhesion testing is performed by applying a mixture of resin component A and curative B to the surface of a 2"×6" (2.5×15 cm) SMC substrate (323IF/271 and 323IF/9469, from Magna) and bonding the SMC substrate to a SMC substrate. The bond thickness is 30 mils (0.75 mm). The resin component and curative are mixed by extruding the materials from their respective cartridges at a volume ratio of 1:1, passing them through a static mixer at about 25° C. The mixture is either applied immediately to the SMC substrates, or else are held for various open times prior to application, under conditions as indicated in Table 1 to evaluate open time. The SMC/adhesive assembly is in each case mounted onto a press and immediately heated to 200° F. (~93° C.) for three minutes to cure the adhesive. Cured samples are tested either immediately or after aging for 24 hours at room temperature, to evaluate failure modes. Failure mode evaluation is performed on three duplicate samples using a wedge-peel test. The % fiber tear mode of adhesive failure is evaluated visually. The average of the three tests is as reported in Table 1, for each set of conditions.

TABLE 1

| | | Open Time, conditions[1] | | | | | |
|---|---|---|---|---|---|---|---|
| | | None | 5 min @ RT | 10 min @ RT | 15 min @ RT | 5 min @ 30° C., 80% RH | 10 min @ 30° C., 80% RH | 15 min @ 30° C., 80% RH |
| | | Failure Mode | | | | | | |
| Initial | Test 1 | FT[2] | 90% FT | FT | 10% FT | FT | FT | 85% FT |
| | Test 2 | 85% FT | FT | 90% FT | 90% FT | FT | FT | FT |
| | Test 3 | 85% FT | 95% FT | 60% FT | FT | FT | 90% FT | 35% FT |
| After 24-hours | Test 1 | 90% FT | FT | FT | FT | FT | FT | 90% FT |
| | Test 2 | FT | FT | FT | FT | FT | FT | FT |
| | Test 3 | FT | FT | FT | FT | FT | FT | 90% FT |

[1]RT means room temperature (~25° C.), RH means relative humidity.
[2]FT means fiber tear mode of failure. Entries with percentage values indicate the % age of failure attributed to fiber tear, with the mode of the remaining failure being adhesive failure mode.

The data in Table 1 indicates that the adhesive of the invention is capable of delivering significant open times together with rapid cure and excellent adhesion. Failure mode is almost always entirely or mostly fiber tear failure mode, irrespective of open time up to 15 minutes, and even when the adhesive is kept under warm and humid conditions during its open time. The results are especially good after the cured adhesive is aged for 24 hours, showing that some further property development continues to occur after the initial cure conditions have been removed.

EXAMPLE 2

Resin component: 24.69 parts of a 2.7 functional polymeric MDI (PAPI® 27 from The Dow Chemical Company) and 21.37 parts of a carbodiimide-modified MDI (Isonate® 143L, from The Dow Chemical Company) are heated under vacuum. 32.77 parts of calcined clay and 0.48 part of fumed silica are added and mixed in. 15.2 parts of a 2000 molecular weight poly(propylene oxide) diol are added and mixed in while maintaining vacuum and the temperature at 90° C. The mixture is maintained at that temperature until a constant isocyanate content is obtained. The resulting quasi-prepolymer is then cooled to room temperature.

88.5 parts of the resulting mixture are then blended with 3 parts of the same carbodiimide-modified MDI, 8 parts of a 60/40 by weight blend of titanium dioxide particles in diisononyl phthalate and 0.2 parts of a blend containing 25% dimethyldineodecanoatetin catalyst (Fomrez® UL-28 from Momentive Performance Products) mixed into 75% of diisononyl phthalate. The resulting resin component has an isocyanate equivalent weight of 318. It is placed into a plastic cartridge.

The storage stability of this resin component is evaluated at 54° C. using the method described in Example 1. The isocyanate content drops slightly from an initial value of 12.9% to 12.2%. The viscosity increases from 9560 cps to 13,373 cps. These values indicate good storage stability despite the presence of the catalyst.

Curative Component: 49 parts of the Voranol® 4701 polyol described in Example 1, 3 parts of the Voranol® 360 polyol described in Example 1, 8 parts of propylene glycol and 1.5 parts of bis(4-amino-3-methylcyclohexyl)methane (Ancamine 2049, from Air Products and Chemicals) are formed into a mixture.

95.3 parts of the resulting mixture are then further blended with 0.2 parts of fumed silica, 2 parts of calcium oxide, 0.5 parts of a silicone defoamer (Byk 067A from Byk-Chemie GmbH), and 2 parts of a 25/75 by weight blend of phenol blocked 1,5-diazabicyclo(5,4,0)undec-5-ene (Polycat® SA-1 catalyst) in the Voranol 4701 polyol. The mixture is inserted into a plastic cartridge. The resulting curative component has an equivalent weight per isocyanate-reactive group of 384.

Wedge-peel testing is performed in the general manner described in Example 1. Prior to adhesion testing SMC substrates were aged either at room temperature condition or 24 hrs at 90° F. (32° C.)/70% relative humidity. Open times of adhesive are either 3 minutes at 72° F. (22° C.) and 50% relative humidity, three minutes at 90° F. (32° C.) and 70% relative humidity, or 10 minutes at 100° F. (38° C.), as indicated in Table 2 below. Curing conditions are either 250° F. (121° C.) for 120 seconds or 300° F. (149° C.) for 100 seconds, as indicated in Table 2 below. The substrates are either Continental Structural Plastics (CSP) 850W SMC or B1R748 SMC. Results are as indicated in Table 2.

TABLE 2

| Wedge Peel adhesion results, load (pounds, (N)) and % fiber tear | | |
|---|---|---|
| Open time/curing | Substrate | |
| conditions | 850W SMC | B1R478 SMC |
| 3 min at 22° C./50% RH; 121° C./120 seconds | 17 pounds (75.6N), 75% fiber tear | 17 pounds (75.6N), 45% fiber tear |
| 3 min at 32° C./70% RH; 121° C./120 seconds | 18 pounds (80N), 85% fiber tear | 16 pounds (71.2N), 80% fiber tear |
| 3 min at 22° C./50% RH; 149° C./100 seconds | 14 pounds (62.3N), 40% fiber tear | 15 pounds (66.7N), 75% fiber tear |
| 10 min at 38° C.; 121° C./120 seconds | 16 pounds (71.2N), 75% fiber tear | 22 pounds (97.9N), 100% fiber tear |
| 10 min at 38° C.; 149° C./100 seconds | 18 pounds (80N), 60% fiber tear | 33 pounds (146.8N), 100% fiber tear |

These results indicate that good bond strength and the desired failure mode (high fiber tear) is obtained with the adhesive of the invention.

Lap shear testing is performed using the same adhesive. Lap shear samples are prepared from two 1"×3" test coupons, with a bond overlap of 1 inch. A ¼-½ inch bead of the adhesive is used to provide an adhesive layer about 30 mils (0.75 mm) thick. The adhesive is mixed and applied in the same general manner as described for the wedge peel testing. Open times are either 3 minutes at 72° F. (22° C.) and 50% relative humidity, three minutes at 90° F. (32° C.) and 70% relative humidity, or 10 minutes at 100° F. (38° C.), as indicated in Table 2 below. Curing conditions are either 250° F. (121° C.) for 120 seconds or 300° F. (149° C.) for 100 seconds, as indicated in Table 2 below. The substrates are either CSP 850W SMC or CSP B1R748 SMC. Results are as indicated in Table 3.

TABLE 3

| Lap Shear adhesion results, load (pounds/square inch, (MPa)) and % fiber tear | | |
|---|---|---|
| Open time/curing | Substrate | |
| conditions | 850W SMC | B1R478 SMC |
| 3 min at 22° C./50% RH; 121° C./120 seconds | 521 psi (3.6 MPa), 100% fiber tear | 663 psi (4.6 MPa), 100% fiber tear |
| 3 min at 32° C./70% RH; 121° C./120 seconds | 649 psi (4.5 MPa), 100% fiber tear | 729 psi (5.0 MPa), 100% fiber tear |
| 3 min at 22° C./50% RH; 149° C./120 seconds | 659 psi (4.6 MPa), 100% fiber tear | 548 psi (3.8 MPa), 100% fiber tear |
| 3 min at 32° F./70% RH; 149° F./100 seconds | 643 psi (4.5 MPa), 100% fiber tear | 426 psi (2.9 MPa), 45% fiber tear |

These results again indicate good bond strength and the desired failure mode (high fiber tear).

Additional lap shear testing is performed at room temperature, on samples that are prepared with an open time of 3 minutes at 90° F. (32° C.)/70% relative humidity, cured at 300° F. (149° C.) for 100 seconds and then post-baked at 300° F. (149° C.) for either 30 or 60 minutes. The average strength for the samples postbaked for 30 minutes is 665 psi (4.6 MPa), with 100% fiber tear. The average strength for the samples postbaked for 60 minutes is 657 psi (4.6 MPa), again with 100% fiber tear.

Still further lap shear testing is performed at 250° F. (121° C.), on samples that are prepared with an open time of 3 minutes at 90° F. (32° C.)/70% relative humidity, cured at 300° F. (149° C.) for 100 seconds and then post-baked at 300° F. (149° C.) for 30 minutes. The average strength for the samples postbaked for 30 minutes is 275 psi (1.9 MPa), with fiber tears ranging from 80 to 100%.

No significant change in color of adhesive is observed upon post-bake.

EXAMPLE 3

Resin component: 24.69 parts of a 2.7 functional polymeric MDI (PAPI® 27 from The Dow Chemical Company) and 21.37 parts of a carbodiimide-modified MDI (Isonate® 143L, from The Dow Chemical Company) are heated under vacuum. 32.77 parts of calcined clay and 0.48 part of fumed silica are added and mixed in. 15.2 parts of a 2000 molecular weight poly(propylene oxide) diol, The mixture is maintained at that temperature until a constant isocyanate content is obtained. The resulting quasi-prepolymer is then cooled to room temperature.

96.5 parts of the resulting mixture are then blended with 3.5 parts of 1,6-hexane diisocyanate, and 1.0 part of a blend of 30 parts of dibutyltin dimercaptide catalyst (Fomrez® UL-6) mixed into 100 parts of diisononyl phthalate. The resulting resin component has an isocyanate equivalent weight of 299. It is placed into a plastic cartridge.

Curative Component: 49 parts of the Voranol® 4701 polyol described in Example 1, 3 parts of the Voranol® 360 polyol described in Example 1, 8 parts of propylene glycol and 1.5 parts of bis(4-amino-3-methylcyclohexyl)methane (Ancamine 2049, from Air Products and Chemicals) are formed into a mixture.

82.65 parts of the resulting mixture are then further blended with 1.85 parts of propylene glycol, 4.5 parts of a polypropoxylated dibutyl pyrophosphoric acid (Antiblaze 82, from Albemarle Corporation), 2 parts of a 25/75 by weight blend of phenol blocked 1,5-diazabicyclo(5,4,0)undec-5-ene (Polycat® SA-1 catalyst) in the Voranol 4701 polyol, 1.5 parts of calcium oxide, 0.5 parts of the Byk 067A defoamer, 4.9 parts of titanium dioxide paste and an additional 2.1 parts of the Voranol® 4701 polyol. The mixture is inserted into a plastic cartridge. The resulting curative component has an equivalent weight per isocyanate-reactive group of 342.

Wedge-peel testing is performed in the general manner described in Example 1. Open times are either 3 minutes at 72° F. (22° C.) and 50% relative humidity, three minutes at 90° F. (32° C.) and 70% relative humidity, or 10 minutes at 100° F. (38° C.), as indicated in Table 2 below. Curing conditions are either 250° F. (121° C.) for 120 seconds or 300° F. (149° C.) for 100 seconds, as indicated in Table 2 below. The substrates are either Magna 850W SMC or Magna B1R748 SMC. Results are as indicated in Table 4.

TABLE 4

Wedge Peel adhesion results, load (pounds) and % fiber tear

| Open time/curing conditions | Substrate | |
|---|---|---|
| | 850W SMC | B1R478 SMC |
| 3 min at 70° F. (22° C.)/ 50% RH; 250° F. (121° C.)/120 seconds | 21 pounds (93.4N), 100% fiber tear | 21 pounds (93.4N) 90% fiber tear |
| 3 min at 90° F. (32° C.)/ 70% RH; 250° F. (121° C.)/120 seconds | 18 pounds (80N), 85% fiber tear | 25 pounds (111.2N), 75% fiber tear |
| 3 min at 70° F. (22° C.)/ 50% RH; 300° F. (149° C.)/100 seconds | 19 pounds (84.5N), 95% fiber tear | 27 pounds (120.1N), 80% fiber tear |
| 10 min at 100° F. (38° C.); 250° F. (121° C.)/120 seconds | 20 pounds (89N), 100% fiber tear | 21 pounds (93.4N), 100% fiber tear |
| 10 min at 100° F. (38° C.); 300° F. (149° C.)/100 seconds | 22 pounds (97.9N), 100% fiber tear | 21 pounds (93.4N), 100% fiber tear |

These results indicate that good bond strength and the desired failure mode (high fiber tear) is obtained with the adhesive of the invention.

Lap shear testing is performed using the same adhesive, in the same manner as described in Example 2. Open times are either 3 minutes at 72° F. (22° C.) and 50% relative humidity, three minutes at 90° F. (32° C.) and 70% relative humidity, or 10 minutes at 100° F. (38° F.), as indicated in Table 2 below. Curing conditions are either 250° F. (121° C.) for 120 seconds or 300° F.). (149° for 100 seconds, as indicated in Table 2 below. The substrates are either Magna 850W SMC or Magna B1R748 SMC. Results are as indicated in Table 5.

TABLE 5

Lap Shear adhesion results, load (pounds/cubic inch (MPa)) and % fiber tear

| Open time/curing conditions | Substrate | |
|---|---|---|
| | 850W SMC | B1R478 SMC |
| 3 min at 70° F. (22° C.)/50% RH; 250° F. (121° C.)/120 seconds | 670 psi (4.6 MPa), 100% fiber tear | 661 psi (4.6 MPa), 70% fiber tear |
| 3 min at 90° F. (22° C.)/70% RH; 250° F. (121° C.)/120 seconds | 578 psi (4.0 MPa), 65% fiber tear | 562 psi (3.9 MPa), 50% fiber tear |
| 3 min at 70° F. (22° C.)/50% RH; 300° F. (149° C.)/120 seconds | 726 psi (5.0 MPa), 100% fiber tear | 549 psi (3.8 MPa), 100% fiber tear |
| 3 min at 90° F. (32° C.)/50% RH; 300° F. (149° C.)/100 seconds | 623 psi (4.3 MPa), 100 fiber tear | 495 psi (3.4 MPa), 70% fiber tear |

These results again indicate good bond strength and the desired failure mode (high fiber tear).

Additional lap shear testing is performed at 250° C. (121 C.), on samples that are prepared with an open time of 3 minutes at 90° F. (32° C.)/70% relative humidity, cured at 300° F. (149° C.) for 100 seconds and then post-baked at 300° F. (149° C.) for 30 minutes. The average strength is 290 psi (2 MPa); fiber tear ranges from 0 to 100%.

EXAMPLE 4

Resin component: 26 parts of a 2.7 functional polymeric MDI (PAPI® 27 from The Dow Chemical Company) and 22.5 parts of a carbodiimide-modified MDI (Isonate® 143L, from The Dow Chemical Company) are heated under vacuum. 34.55 parts of calcined clay and 0.5 part of fumed silica are added and mixed in. 16 parts of a 2000 molecular weight poly(propylene oxide) diol are added and mixed in while maintaining vacuum and the temperature at 90° C. The mixture is maintained at that temperature until a constant isocyanate content is obtained.

The resulting quasi-prepolymer is then blended with 0.25 part of fumed silica and 0.2 part of a blend of 30 parts of dibutyltin dimercaptide catalyst (Fomrez® UL-6) mixed into 100 parts of diisononyl phthalate. The resulting resin component has an isocyanate equivalent weight of 299. It is placed into a plastic cartridge.

Curative Component: This curative is prepared by blending 30 parts of a copolymer polyol (40% by weight dispersion of styrene-acrylonitrile particles into a poly(propylene oxide) triol, equivalent weight 1870 Voranol® 3943A, The Dow Chemical Company), 14 parts of the Voranol® 4701 polyol described in Example 1, 3 parts of the Voranol® 360 polyol described in Example 1, 8 parts of propylene glycol, 5 parts of polypropoxylated dibutyl pyrophosphoric acid (Antiblaze 82, from Albemarle Corporation), 1.5 parts of bis(4-amino-3-methylcyclohexyl)methane (Ancamine 2049, from Air Products and Chemicals), 31 parts of calcined clay, 5 parts of a molecular sieve, 0.5 parts of fumed silica and 2 parts of a 25/75 by weight blend of phenol blocked 1,5-diazabicyclo(5, 4,0)undec-5-ene (Polycat® SA-1 catalyst) in the Voranol 4701 polyol. The mixture is inserted into a plastic cartridge. The resulting curative component has an equivalent weight per isocyanate-reactive group of 351.

This adhesive system exhibits a tack-free time of 30 minutes at 23° C. and 50% relative humidity. Open time is 15 minutes under the same conditions. The cured adhesive has a tensile strength of 11.2 MPa and an elongation of 45%. Lap-shear strength, measured according to the procedure described in the previous examples, is 16.1 MPa when measured at room temperature and 1.8 MPa at 82° C.

Wedge-peel adhesion testing is performed by applying a mixture of resin component A and curative B to the surface of a 2"×6" (2.5×15 cm) SMC substrate (3231F/271 and 3231F/9469, from Magna) and bonding the SMC substrate to a SMC substrate. The bond thickness is 30 mils (0.75 mm). The resin component and curative are mixed by extruding the materials from their respective cartridges at a volume ratio of 1:1, passing them through a static mixer at about 25° C. The mixture is held for 5 minutes open times prior to application. The SMC/adhesive assembly is in each case mounted onto a press and immediately heated to 300° F. (~449° C.) for three minutes to cure the adhesive and post-baked for 30 minutes at 275° F. (135° C.). Duplicate samples are made in the same manner for environmental testing.

Humidity conditioning is performed by aging samples at 100° F. (38° C.) and 100% RH for 250 hours prior to testing.

Salt spray conditioning is performed by subjecting the sample to a salt spray for 250 hours prior to testing.

Water soak conditioning is performed by immersing the sample in water prior to testing.

Cold moisture conditioning is performed by exposing the samples to 15 cycles of: a 24 hours humidity per ASTM D2247, followed by 20 hours at −23° C., followed by four hours at 23° C. and 50% RH; followed by 750 additional hours of humidity exposure per ASTM D2247.

Heat aging is performed by heating the sample to 175° C. (80° C.) for 250 hours.

Environmental cycling conditioning is performed by subjecting the sample to ten cycles, wherein each cycle consists of one day at 79° C., one day at 100° F. (38° C.) and 100% RH and one day at −29° C. Cured, post-baked and conditioned samples are tested evaluate failure modes. Failure mode evaluation is performed on three duplicate samples using a wedge-peel test. The % fiber tear mode of adhesive failure is evaluated visually. The results are as reported in Table 6, for each set of conditions.

TABLE 6

| Conditioning | Mode of Failure |
|---|---|
| Humidity | 100% FT |
|  | 100% FT |
|  | 100% FT |
| Salt Spray | 70% FT |
|  | 70% FT |
|  | 80% FT |
| Water Soak | 100% FT |
|  | 100% FT |
|  | 50% FT |
| Moisture Cold | 90% FT |
|  | 100% FT |
|  | 85% FT |
| Heat Aging | 100% FT |
|  | 90% FT |
|  | 100% FT |
| Environmental Cycling | 80% FT |
|  | 90% FT |
|  | 85% FT |

These results show that the adhesive of the invention performs well when exposed to a variety of environmental conditions.

What is claimed is:

1. A process for bonding a pair of sheet molding compound substrates, comprising
   a) mixing together a resin component A and a curative B of a two-component polyurethane system at a mixing ratio such that the mixture contains an excess of isocyanate groups, to form a heat-curable adhesive;
   b) applying the heat curable adhesive to a bondline intermediate to the substrates; and
   c) heating the heat-curable adhesive to a temperature of at least that at which a blocked aza catalyst becomes activated to cure the heat-curable adhesive and form an adhesive bond between the substrates at the site of the bondline,
      wherein each of the resin component A and the curative B are liquids having a Brookfield viscosity of from 5,000 to 50,000 cps at 25° C.,
      the resin component A has an isocyanate equivalent weight of from 230 to 350 and comprises (A-1) a mixture of isocyanate compounds, which mixture is liquid at 25° C., has an average isocyanate content of from 15 to 23% by weight and includes a polyisocyanate compound containing from 2 to 4 isocyanate groups per molecule, and which is devoid of urethane or urea linkages and a prepolymer which is a reaction product of at least one polyisocyanate containing from 2 to 4 isocyanate groups per molecule which is devoid of urethane or urea linkages and at least one isocyanate-reactive compound that includes a difunctional polyether polyol having a molecular weight of from 1000 to 3000 and (A-2) at least one tin (IV) catalyst, and
      the curative B has an equivalent weight per isocyanate-reactive group of from 250 to 450 and comprises (B-1) at least one polyether polyol which contains from 2 to 4 hydroxyl groups per molecule and has a number average molecular weight of from 3000 to 20,000; (B-2) at least one polyol having from 4 to 8 hydroxyl groups per molecule and a molecular weight of from 200 to 1000 and (B-3) at least one blocked aza catalyst which is heat activatable at a temperature of at least 65° C., and further wherein upon adhesion testing the bonded pair of sheet molding compound substrates fails in a fiber tear mode.

2. The process of claim 1, wherein, in step a, wherein equal volumes of the resin component A and the curative B are mixed in step a) and resin component A contributes from 1.10 to 1.35 isocyanate groups per isocyanate-reactive group contributed by the curative B.

3. The process of claim 2, wherein no primer is applied to the substrates prior to the application of the heat-curable adhesive.

4. The process of claim 3, wherein in step c), the temperature is at least 80° C.

* * * * *